US011865986B1

(12) United States Patent
Liu et al.

(10) Patent No.: US 11,865,986 B1
(45) Date of Patent: Jan. 9, 2024

(54) LOW IMPACT DETECTION TECHNIQUES

(71) Applicant: Zoox, Inc., Foster City, CA (US)

(72) Inventors: Da Liu, Milpitas, CA (US); Mackenzie Cunningham, San Mateo, CA (US); Moritz Boecker, Millbrae, CA (US)

(73) Assignee: Zoox, Inc., Foster City, CA (US)

( * ) Notice: Subject to any disclaimer, the term of this patent is extended or adjusted under 35 U.S.C. 154(b) by 199 days.

(21) Appl. No.: 17/498,516

(22) Filed: Oct. 11, 2021

(51) Int. Cl.
  *B60R 21/0136* (2006.01)
  *G07C 5/00* (2006.01)
  *G01L 1/22* (2006.01)
  *B60R 21/017* (2006.01)
  *B60R 16/03* (2006.01)

(52) U.S. Cl.
  CPC .......... *B60R 21/0136* (2013.01); *B60R 16/03* (2013.01); *B60R 21/0173* (2013.01); *G01L 1/22* (2013.01); *G07C 5/008* (2013.01)

(58) Field of Classification Search
  CPC . B60R 21/0136; B60R 16/03; B60R 21/0173; G01L 1/22; G07C 5/008
  See application file for complete search history.

(56) References Cited

U.S. PATENT DOCUMENTS

| | | | | |
|---|---|---|---|---|
| 2009/0024323 | A1* | 1/2009 | Tanabe | B60R 21/0136 293/117 |
| 2014/0070929 | A1* | 3/2014 | Myers | G07C 9/00309 340/426.18 |
| 2019/0359172 | A1* | 11/2019 | Galicia Rodríguez | G08B 13/00 |

* cited by examiner

*Primary Examiner* — Gertrude Arthur Jeanglaude
(74) *Attorney, Agent, or Firm* — EIP US LLP (57) ABSTRACT

There is provided a method and system for vehicle security protection. The method comprises: determining, at a detector, a first sensor signal from a flex sensor in an exterior panel of a vehicle, wherein the flex sensor and detector are powered by a power supply of the vehicle, and wherein a magnitude of the first sensor signal is based on an amount of bending of the flex sensor; determining, at the detector, based on the first sensor signal, that the exterior panel of the vehicle is deformed; and outputting, from the detector, a first alert signal, wherein a first controller of the vehicle is configured to transition from a low-power state to a high-power state based at least in part on the first sensor signal.

20 Claims, 7 Drawing Sheets

LOW IMPACT DETECTION TECHNIQUES

BACKGROUND

Vehicles are vulnerable to being damaged due to interactions with other objects. For example, vehicles may be the subject of interactions such as vandalism, low-speed impacts, or other collisions. The risk of such interactions increases in urban areas. Furthermore, where the vehicle is a self-driving vehicle, the risk is further increased due to the lack of a presence of a human operator.

BRIEF DESCRIPTION OF DRAWINGS

The detailed description is described with reference to the accompanying figures. The use of the same reference numbers in different figures indicates similar or identical components or features.

DETAILED DESCRIPTION

The present disclosure describes methods and systems for detecting low-level interactions with a vehicle by external objects. Low-level interactions, which, as described below, may be interactions having less than 1000 J of impact energy, may include impacts or other forces applied to the vehicle by external objects. For example, an external object may be another vehicle, and the interaction with the vehicle operating according to the methods and systems described herein may be a slow-speed impact from the other vehicle as it attempts to perform a maneuver. In some examples, the external object may be a pedestrian or object used by a pedestrian who intends to tamper with or otherwise vandalize the vehicle. In some examples, the external object may be an object other than a pedestrian or vehicle, but that impacts or otherwise applies a force to the vehicle. For example, an animal may collide with the vehicle, or a branch from a tree may fall onto the vehicle. A low-level interaction may be determined by the amount of energy involved. For example, a low-level interaction may be an interaction in which less than 1000 J of impact energy. A low-level interaction may alternatively be considered to be interactions lower than a level at which airbags may deploy within the vehicle.

Modern vehicles can include sensor systems configured to monitor the external environment. In particular, self-driving vehicles can include a plurality of different sensor systems to monitor the external environment while the vehicle is running. A self-driving vehicle may monitor the external environment while in an operational state, i.e. while driving, in order to take an action when a low-level interaction, such as those described above, occurs or is expected to occur. For example, while driving, the vehicle may take evasive action to avoid a collision, or may warn an external object that a low-level interaction is likely using one or more emitters of the vehicle. In such a situation, while in an operational state, the vehicle's systems, including sensors, emitters, and/or controllers may be operating by drawing power from a main power source, such as an electric motor or main battery, and one or more controllers of the vehicle may therefore decide upon an appropriate course of action for the vehicle. However, self-driving vehicles may have difficulties detecting low-level interactions if, for example, an interacting object is outside of a field of view of the sensor system or the interacting object moves at a relatively slow speed compared to the vehicle.

When a vehicle is parked or in another non-operational, low-power, or other state, sensors, emitters, and/or controllers may be switched off, disconnected from, or draw less power from the main power source, to avoid using power unnecessarily. The main power source may also be placed into a low-power state, in which it is switched off, disconnected, or otherwise provides less power to the components of the vehicle. This is useful in electric vehicles to avoid the stored electrical energy in a main battery of the vehicle from being used up when the vehicle is not driving. Such a state may be referred to as a sleep state, an auxiliary power state, or a low-power state. In contrast, the operational state may be referred to as a high-power state because power is being provided to certain systems of the vehicle.

A low-power state may therefore be defined as a state in which less power is drawn from a power source of the vehicle than in another state. In some examples, a low-power state may be a state in which one or more systems or components of the vehicle do not draw power from a main power source or supply. In some examples, a low-power state may be a state in which less power is supplied for powering systems and/or components than in another state. The component in these examples may be a main control unit of the vehicle. In some examples, a low-power state may be a state in which the vehicle is not driving. In some examples, a low-power state may be a state in which the main power supply is switched off. In contrast, a high-power state may be a state in which the vehicle is driving or is fully operational, or in which the main power source is switched on or supplies power to one or more components to which power is not supplied in the low-power state. The low- and high-power states may be relative to one another, i.e. the low-power state is a state in which the power use is lower than the high-power state and the high-power state is a state in which the power use is higher than the low-power state.

Vehicles may have a plurality of different power states. For example, when operating, a vehicle may have a normal power state and a power conserving state. In the power conserving state may be a state in which power is supplied to critical systems only, such as the drive systems, to ensure that the vehicle is able to perform its key functions while conserving power. In the normal power state, more systems and components are supplied power than in the power conserving state. In such an example, the low-power state may be the power conserving state or another.

When the vehicle is in the low-power state, it may be unable to monitor and react to low-level interactions in the same way as when it is driving and in an operational state. However, it is still important to be able to monitor and react to low-level interactions while the vehicle is parked, to ensure that the vehicle is secure and is not at risk of significant damage, as well as ensuring that appropriate action is taken in response to the low-level interaction. For example, it is important for the vehicle to ensure that appropriate emergency services are alerted if an object interacts with the parked vehicle in a way that may have cause injury to a human being.

Accordingly, the methods and systems described in this disclosure provide detection of low-level interactions through a low-power system that does not drain power from a main power source of the vehicle.

The methods and systems may make use of an auxiliary power source. An auxiliary power sources may comprise an energy storage device, such as a back-up battery of the vehicle. The auxiliary power source may be, for example, a 12V battery. The auxiliary power source may be a power source used by the vehicle to power other systems necessary for maintaining the vehicle while the vehicle is parked. In contrast to the main power source, the auxiliary power source provides power to systems that remain operational while the vehicle is parked, and may not provide motive power to the vehicle. In some examples, the auxiliary power source may be a battery configured to start a motor of the vehicle. The battery may be a rechargeable battery.

Flex sensors incorporated into exterior panels defining an exterior surface of the vehicle can be used to detect low-level interactions. The panels may deform during such low-level interactions. Flex sensors are sensors that are configured to flex in response to a force. Flex sensors may comprise flexible sensors, pressure sensors, or force sensors. Flex sensors can be arranged to cause an electrical signal to vary or be generated based on the amount of deformation. Accordingly, a magnitude of an electrical signal may correlate to an amount of deformation of a flex sensor, and therefore an exterior panel. In some examples, the flex sensors may be configured as variable resistors, meaning that a voltage level of an electrical signal from the flex sensors and the auxiliary power source varies based on the amount of deformation of the exterior panels.

The exterior panels may cover a frame of the vehicle. For example, an exterior panel may cover part of or all of an end surface of the vehicle, a side surface of the vehicle, an A-pillar of the vehicle, a B-pillar of the vehicle, a roof of the vehicle. An exterior panel may be or form part of a fender of the vehicle or a fascia of the vehicle. Exterior panels may be formed from a plastic material such as polycarbonate or from a composite material. An exterior panel may be a window or part of a window of the vehicle. Flex sensors may be incorporated within a glass window to sense flexing of the glass. Alternatively, a window may be formed from transparent plastic.

The electrical signal received from the flex sensors may be compared with one or more limit values for the electrical signal. The one or more limit values, which may be referred to as thresholds for the electrical signal, may be set to indicate an allowable level of flexing in the panels or flex sensors. A low-level interaction may be identified or indicated based on a comparison of the electrical signal with the one or more limit values. Said comparison may be performed using one or more low-power detecting devices, such as one or more comparators. The one or more comparators may be powered by the auxiliary power source. The one or more limit values may be provided to the comparators via one or more digital potentiometers.

Where the flex sensors bend in a way that causes the electrical signal to stray above or below the relevant limit value, such a deviation of the electrical signal will be identified by the one or more low-power detecting devices. The low-power detecting devices may be configured to generate an alert signal in response to identifying a deviation that indicates that an exterior panel is deforming due to a low-level interaction such as an impact or other force being applied to the vehicle. The alert signal may be configured to wake the vehicle from its low-power state. Once woken, the vehicle and its systems may perform actions, such as checking that the alert signal was caused by a low-level interaction rather than just noise. Other examples of actions performed by the vehicle may include activating emitters and/or sensors, or alerting a remote system to the low-level interaction. In certain examples, a dedicated low-power monitoring system can be used to monitor and react to detected low-level interactions.

As a brief example, if another vehicle reverses into the vehicle while attempting to park, a panel on an end of the vehicle may deform as the two vehicles touch. The deformation of the panel causes deformation of a flex sensor incorporated into the panel. An electrical signal can be varied by the flex sensor as it deforms. A detecting device can compare the electrical signal to one or more limit values. When a limit value is exceeded by the electrical signal, one or more vehicle systems can be activated, and moved from a low-power state to a high-power state. A main vehicle controller may activate and begin drawing power from the main power source. The main vehicle controller may monitor the electrical signal to confirm that a low-level interaction is taking place. The main vehicle controller may activate one or more other sensors of the vehicle to further monitor the low-level interaction. Based on sensor data, the main vehicle controller may identify a type of the low-level interaction. The main vehicle controller may activate one or more emitters of the vehicle to warn the driver of the other vehicle that a low-level interaction is taking place, contact a remote operator, etc.

Figure 1:
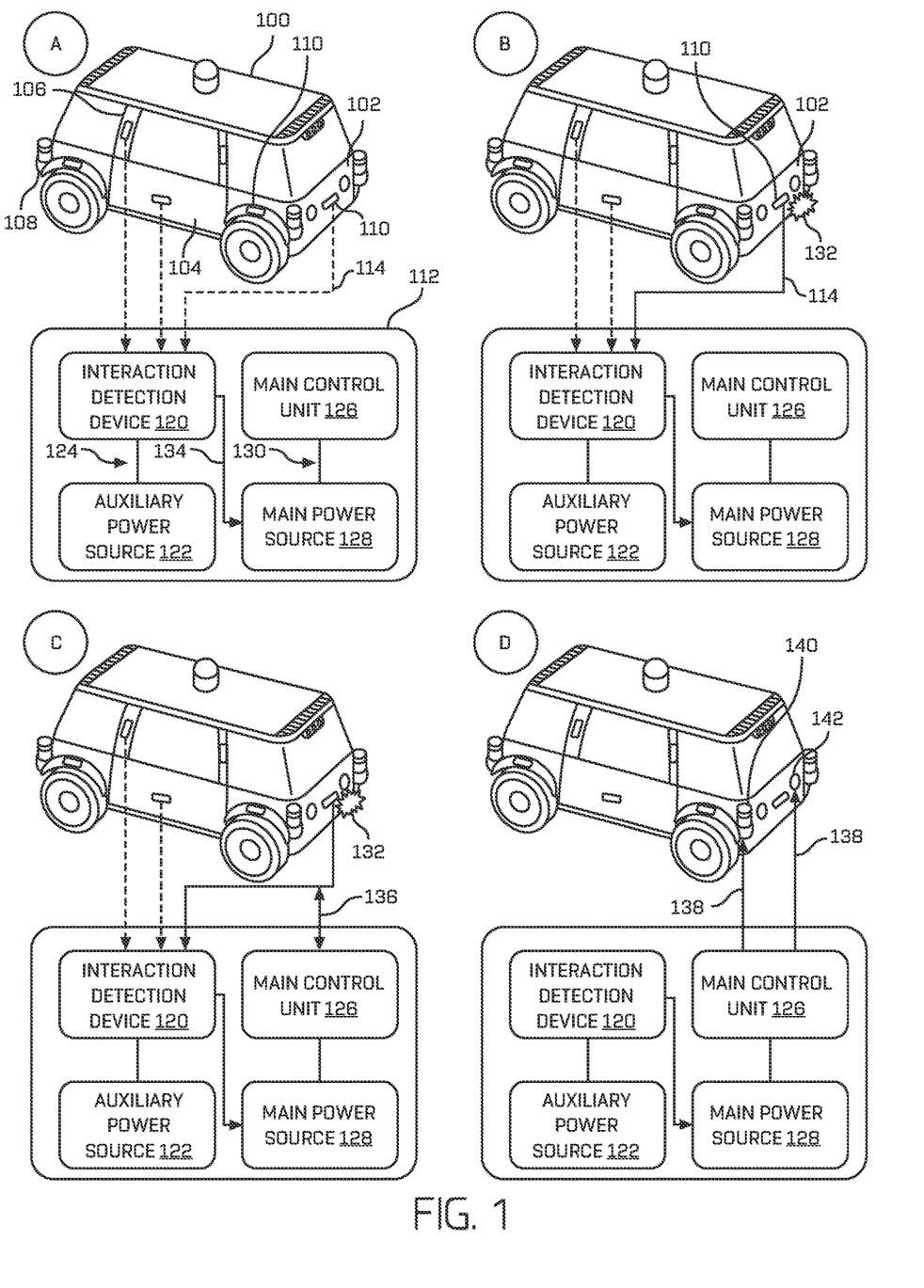
FIG. 1 is a pictorial diagram of an interaction between a parked vehicle and an external object, and detection of the interaction by the vehicle.

To provide a more detailed example, FIG. 1 depicts a low-level interaction using a pictorial diagram. FIG. 1 includes four points in time, labelled A to D, which occur in sequence. At point in time A, a vehicle is parked and is in a low-power state. At points in time B to D, a low-level interaction occurs and systems within the vehicle reacts to the low-level interaction.

Beginning at point in time A of FIG. 1, a vehicle 100 is shown. The vehicle 100 includes a plurality of exterior panels 102, 104, 106, 108. The exterior panels 102, 104, 106, 108 define at least part of an exterior surface of the vehicle 100, with windows, wheels, and other components defining other parts of the exterior surface. In other examples, the windows, parts of the wheels, and/or other components may be considered to be exterior panels.

The exterior panel labelled 102 is an end panel, forming part of an end surface of the vehicle. The exterior panel labelled 104 is a side panel and forms part of a side surface of the vehicle. The exterior panel labelled 106 represents a pillar of the vehicle, in this case a B-pillar as it is situated between two windows. Exterior panels may also be provided on A-pillars or other pillars of the vehicle. The exterior panel labelled 108 is a fender of the vehicle. Each fender may be configured to cover a wheel of the vehicle. Exterior panels may be provided on a roof of the vehicle. One or more fascias (not shown) of the vehicle may also include or comprise exterior panels.

The vehicle 100 comprises a plurality of flex sensors 110. The flex sensors 110 are shown in FIG. 1 provided in or on the exterior panels 102, 104, 106, 108. A flex sensor 110 may be provided in an exterior panel by incorporating the flex sensor 110 between one or more layers of the exterior panel. A flex sensor 110 may alternatively be incorporated onto an exterior panel by bonding the flex sensor 110 to the exterior panel such that the flex sensor 110 and exterior panel bend together.

In FIG. 1, one flex sensor 110 is shown as being provided in each of the end panel 102, the side panel 104, the pillar 106, and the fender 108, as well as in the other pillar and fender that are not labelled. However, it will be appreciated that in some embodiments flex sensors may be incorporated into additional or alternative exterior panels. Furthermore, in some examples, more than one flex sensor may be incorporated into a panel. For example, for large panels, such as the panels 102 and 104 provided on the end and side of the vehicle 100, a plurality of flex sensors 110 may be incorporated. Providing more than one flex sensor 110 can enhance detection across the entire surface of the exterior panels rather than in specific locations. Furthermore, more than one flex sensor enables different orientations of the flex sensors relative to one another and relative to the exterior panel, thereby ensuring that different kinds of flexure may be identified.

The flex sensors 110 can be configured to deform and to cause an electrical signal to vary depending upon the amount of deformation of the flex sensor. A magnitude of the electrical signal may be based on an amount of bending of the flex sensor. In some examples, the magnitude may be correlated to the amount of bending.

In some examples, and as will be described in more detail below in relation to FIG. 2, a flex sensor 110 may comprise a flexible sensor that operates as a variable resistor, whose resistance changes proportionally to the amount of deformation of the flex sensor 110. As deformation of an exterior panel changes based on an amount of impact energy, the electrical signal may also be used to determine an amount of impact energy within the low-level interaction. By incorporating such a flex sensor 110 into a circuit, a voltage level of an electrical signal may be varied based on the amount of deformation of the flex sensor 110. A flex sensor 110 may be described herein as providing am 'output voltage'. As will become apparent from FIG. 2, the output voltage may be a voltage of an electrical signal of a circuit within which the flex sensor 110 is incorporated and causes to vary, but the voltage may not, in some examples, be generated by the flex sensor 110 or output from it. Accordingly, the term 'output voltage' is intended to refer to a voltage that is influenced by the presence of the flex sensor 110. In some examples, the flex sensor may be a voltage source and may generate its own voltage under deformation, for example using piezoelectrics. In some examples, flex sensors can be configured to present a relatively high impedance when in a resting state in order to reduce resting power usage for monitoring the flex sensors. When the sensors deform, a relatively lower impedance may be presented to a monitoring device.

A control system 112 of the vehicle 100 is also shown in FIG. 1. The control system 112 is depicted beneath the vehicle 100 in each of A to D for clarity, but in reality will form part of the vehicle systems within the vehicle 100. Furthermore, the connections and communications between components of the control system 112 are depicted functionally so as to demonstrate how the components interact rather than depicted explicit connections therebetween. More detail in relation to the vehicle systems will be described below in relation to FIG. 7.

The control system 112 shown in FIG. 1 includes an interaction detection device 120 and an auxiliary power source 122. In some embodiments, more than one interaction detection device 120 and corresponding auxiliary power source 122 may be provided. For example, a vehicle may comprise an auxiliary power source 122 and interaction detection device 120 at either end of the vehicle. The control system 112 of FIG. 1 also includes a main control unit 126 and a main power source 128. The interaction detection device 120, which may be referred to as an impact detection device or a detector, is connected to and configured to draw power from the auxiliary power source 122, as indicated by the line 124. The main control unit 126 is connected to and configured to draw power from the main power source 128, as indicated by line 130.

The interaction detection device 120 may be configured to receive electrical signals as inputs from the flex sensors 110 of the vehicle 100. This is indicated in FIG. 1 by the dashed arrows from the flex sensors 110 to the interaction detection device 120, such as arrow 114 from the flex sensor 110 provided in the end panel 102. Each of the flex sensors 110 may be configured to connect to the interaction detection device 120 to provide inputs to it, but for clarity of FIG. 1, only a few arrows are provided to indicate these inputs.

The interaction detection device 120 may be configured to send a control signal to the main power source 128, which is labelled as arrow 134 in FIG. 1. In FIG. 1, the control signal is sent to the main power source 128 in each of the points in time A to D. The control signal may be varied in response to the interaction detection device 120 detecting a low-level interaction, as will be described in more detail below. The operation of the main power source 128 may be based on the control signal, as will be described in more detail below.

At point in time A, the vehicle 100 is parked. For example, the vehicle may be parked in a parking bay at the side of a street. Because the vehicle 100 is parked, its main systems are in a low-power state. For the purposes of FIG. 1, in the low-power state of the vehicle 100 the main control unit 126 does not draw power from the main power source 128 and is not operational. The main power source 128 may also be switched off in this example.

In contrast, the interaction detection device 120 and flex sensors 110 can be configured to operate by drawing power from the auxiliary power source 122. Therefore, low-level impacts and interactions are monitored while the vehicle is parked and its systems are in the low-power state because the auxiliary power source 122 and the components that draw power from it are configured to remain operational while the main power source 128 is turned off.

At point in time B, an interaction occurs, as indicated by the label 132. The interaction 132 may be a low-level interaction. In the example shown in FIG. 1, the interaction 132 occurs at the end panel 102 of the vehicle 100. Because of the interaction 132, the end panel 102 may deform. Due to the deformation of the end panel 102, the flex sensor 110 in the end panel 102 may also deform in a similar way. As the flex sensor 110 bends, it may change an output electrical signal based on the amount of deformation of the flex sensor 110 and, by extension, the panel 102. In point in time B, the interaction 132 causes the electrical signal 114 from the flex sensor 110 in the end panel 102 to change. This change is represented by the arrow 114 being a full, rather than a dashed line as was shown for point in time A. On the other hand, because no interaction is occurring at the flex sensors 110 in the side panel 104 and the pillar 106, the output signal from each of these sensors 110 is the same, as can be seen in the use of the same dashed arrow at point in time B as at point in time A.

The interaction detection device 120 monitors the output signals from the flex sensors 110 and compares them with one or more limit values, which may be referred to as thresholds, threshold values, or limit levels. The limit values may represent maximum acceptable amounts of deformation in their respective panels. The limit values may be set to allow deformation due to natural events such as, for example, heating effects when the vehicle is subjected to direct sunlight. An algorithm may be used to set the limit values. The limit values may be determined according to one or more of panel size, number of flex sensors in the panel, arrangement of the flex sensors in the system, position of the flex sensors in the panel, material of the panel, type of flex sensor used, shape of the panel, or position of the panel. The limit values may also depend on, for example, temperature, humidity, season, incident sunlight, or other environmental conditions that may affect how an exterior panel may deform. For example, a small panel may be stiffer than a larger panel, meaning that a higher force is required to deform it in the same way. In such an example, limit values for an output signal from a flex sensor in the small panel may be set to be more sensitive to changes in the output signal than in the larger panel. This ensures that similar amounts of deflection cause the interaction detection device 120 to identify a low-level interaction. The limit values may be received from the main control unit 126 prior to the main control unit 126 entering its low-power state, as will be described in relation to FIG. 6 below. Alternatively, the interaction detection device 120 may determine the limit values itself.

In the scenario shown in FIG. 1, at point in time B the interaction 132 is sufficient to cause the electrical signal 114 from the flex sensor 110 to exceed its corresponding threshold at the interaction detection device 120. In response, the interaction detection device 120 varies the control signal 134 to become an alert signal. The alert signal 134 is provided to the main power source 128. The alert signal 134 may be a logic signal configured to cause power to be supplied from the main power source 128 to the main control unit 126 in order for the main control unit 126 to become operational again. In other words, the alert signal 134 is configured to cause the main control unit 126 to transition from the low-power state to a high-power state. In this example, the high-power state is a state in which power is supplied to the main control unit 126 from the main power supply 128.

In FIG. 1, the alert signal is depicted as being sent directly to the main power source 128, but in other embodiments the alert signal may be sent to other components or to the main power source 128 via other components.

At point in time C, the interaction 132 is still occurring. Due to the deformation of the end panel 102 and alert signal, the main power source 128 is supplying power to the main control unit 126.

The main control unit 126, upon drawing power from the main power source 128 and therefore waking from the low-power state, may be configured to further monitor the interaction 132. For example, as depicted in FIG. 1 at point C by the arrow 136, the main control unit 126 may be configured to monitor the output signal of the flex sensor 110. This monitoring may be performed to confirm that a low-level interaction did occur, that the low-level interaction is still occurring, and/or, to determine where the low-level interaction is occurring. For example, although FIG. 1 only shows the main control unit 112 monitoring the output signal 114 from the flex sensor 110 in the end panel 102, the main control unit 126 may monitor each of the output signals from the flex sensors 110. This may be useful because the interaction detection device 120 and flex sensors 110 may be configured to output an alert signal that is independent on the flex sensor from which the output signal was received. In other words, the interaction detection device 120 may not include components that are configured to discriminate between the different flex sensors and their locations when generating the alert signal. Such a strategy may enable the interaction detection device 120 to use less power, thereby prolonging the amount of time for which monitoring may be performed. Accordingly, it is useful to be able to determine where the low-level interaction is taking place once more power is available for monitoring, i.e. when the main power source 128 and main control unit 126 are operational.

The main control unit 126 may take additional or alternative actions. The main control unit 126 may send a further alert signal 138, which may comprise a command signal or a control signal, to activate sensors and/or emitters of the vehicle. In some examples, the main control unit 126 may send a further alert signal to other components of the vehicle and/or to a remote computing system via a network. The main control unit 126 may determine, based on the additional monitoring described above, that the low-level interaction is occurring in a particular panel of the vehicle, and may activate one or more sensors and/or emitters corresponding to the particular panel. For example, as shown in the scenario at point in time D of FIG. 1, the main control unit 126 may have determined based on its own monitoring at point in time C, via arrow 136, that the interaction 132 occurred at the end panel 102 of the vehicle 100. Accordingly, the further alert signal 138 may be configured to activate sensors, such as the sensor 140, of the vehicle 100 and/or emitters, such as the headlights 142, of the vehicle 100 positioned close to or on the end panel 102 of the vehicle. In other examples, a plurality of vehicle sensors may be activated to identify the object that caused the low-level interaction, in case the position of the object has changed. For example, a low-level interaction may occur with a pedestrian, who subsequently moves to the other end of the vehicle.

Figure 2:
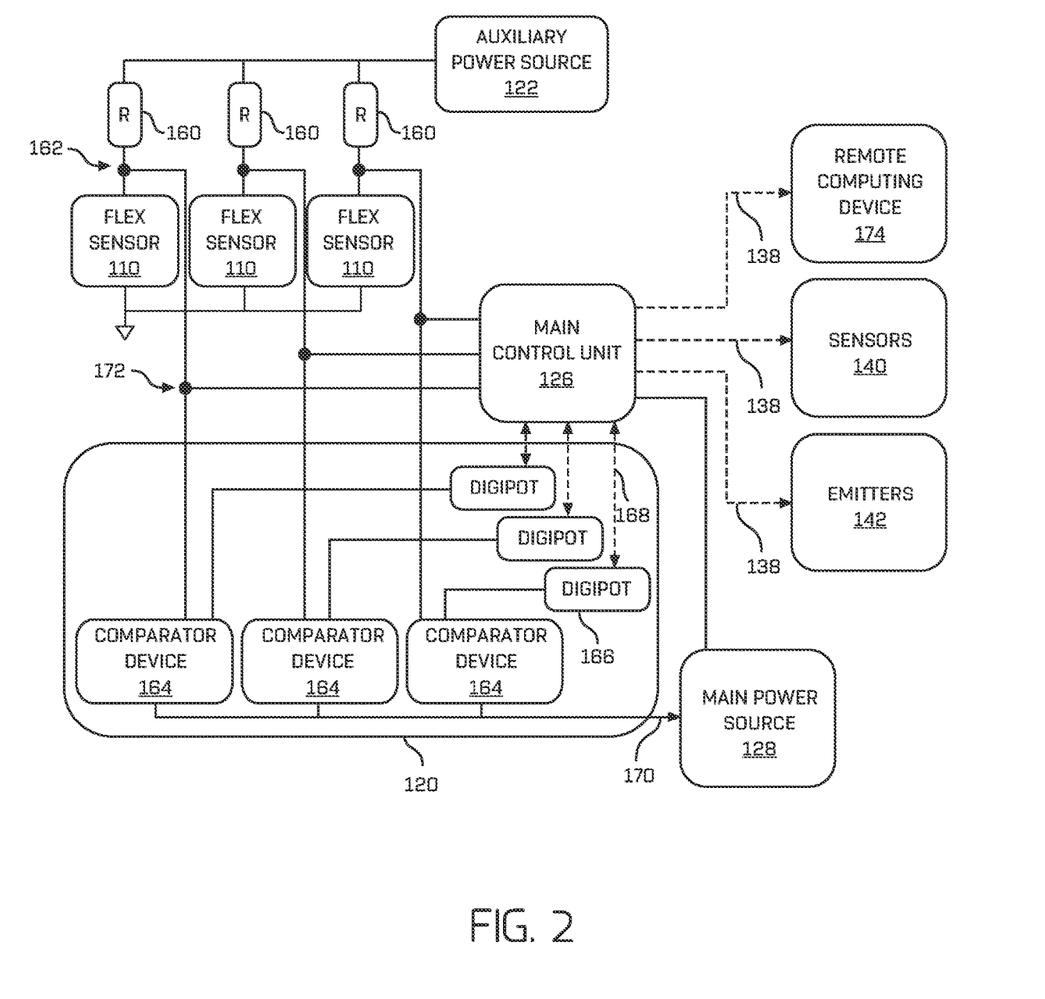
FIG. 2 is a block diagram of a system for detecting interactions with a vehicle.
Figure 3:
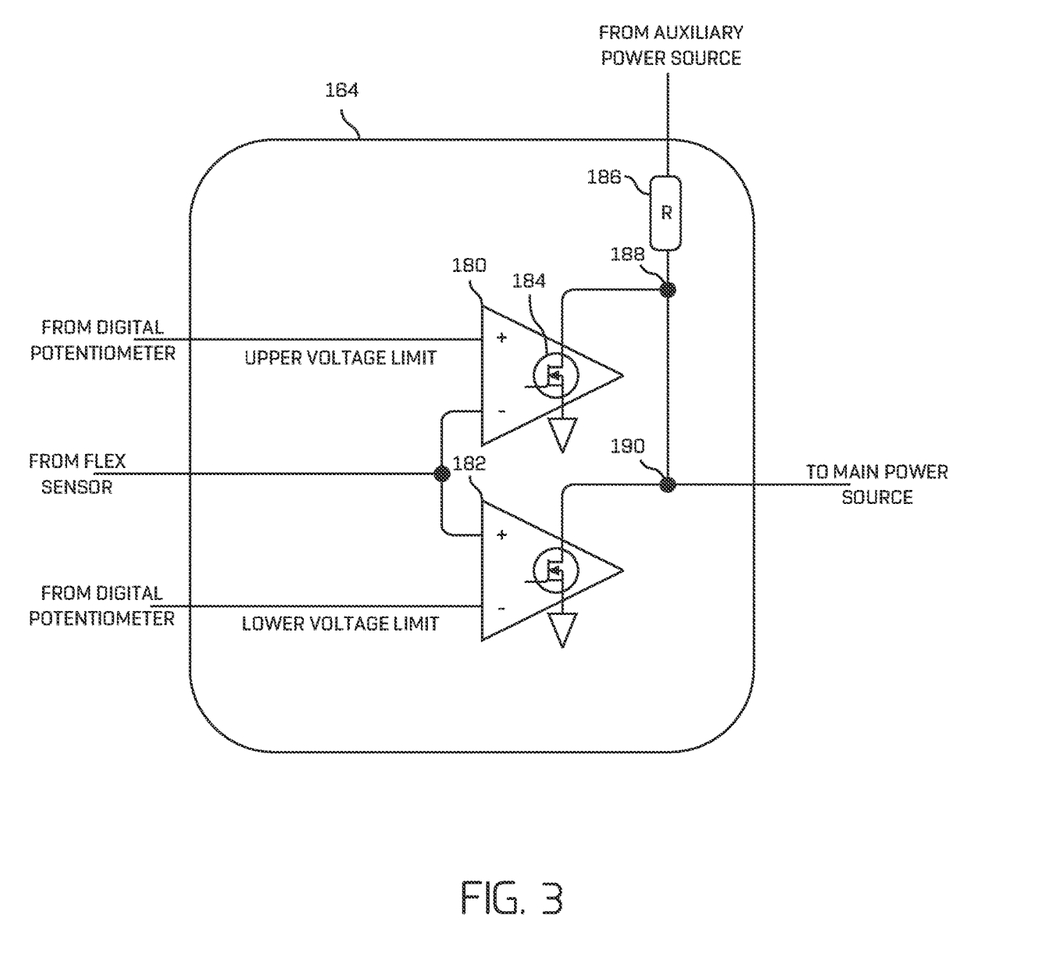
FIG. 3 is a block diagram of a comparator as may be used in the vehicle system of FIG. 2.
Figure 5:
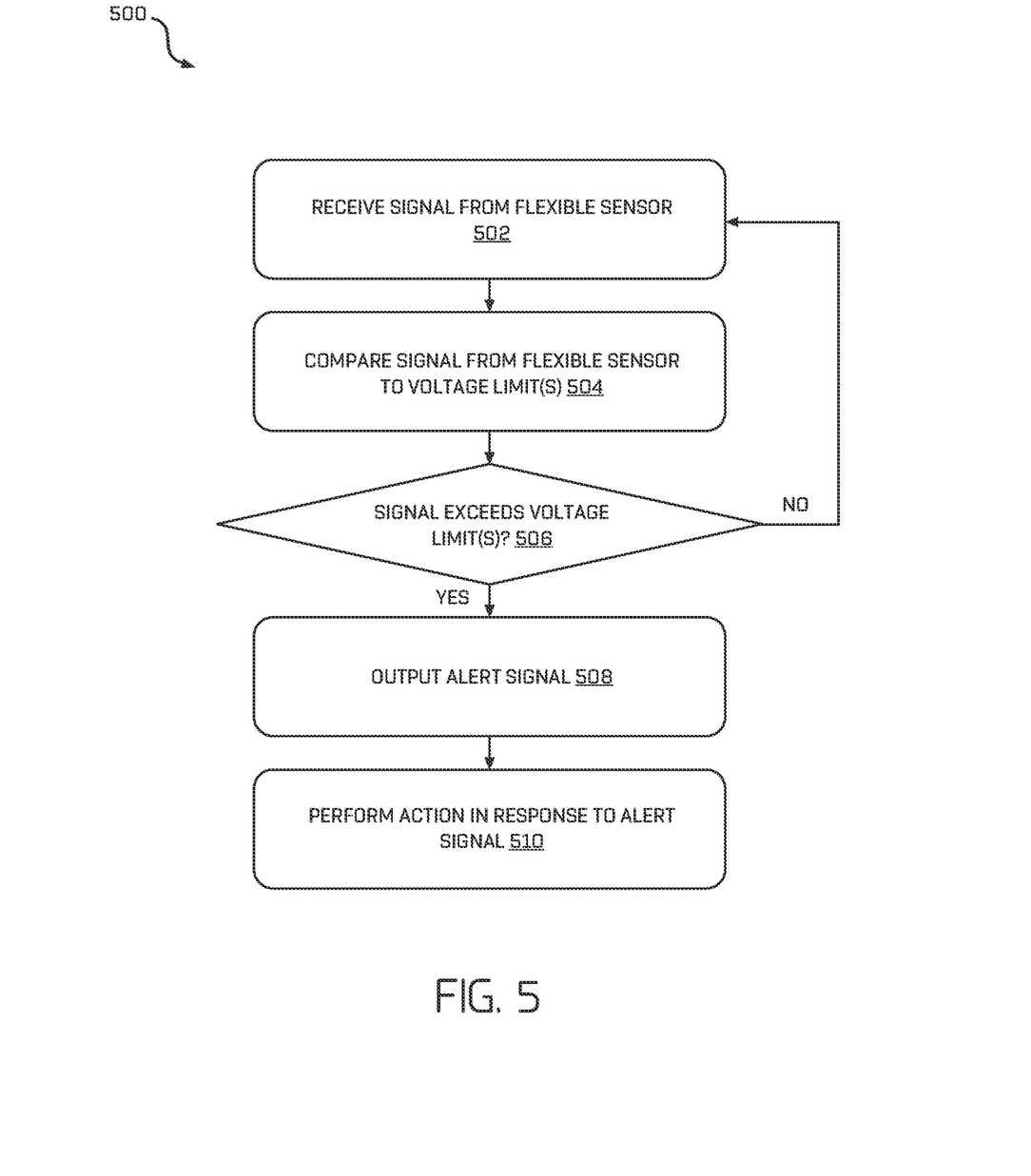
FIG. 5 depicts a flow chart of an example process for detecting interactions with a vehicle.
Figure 6:
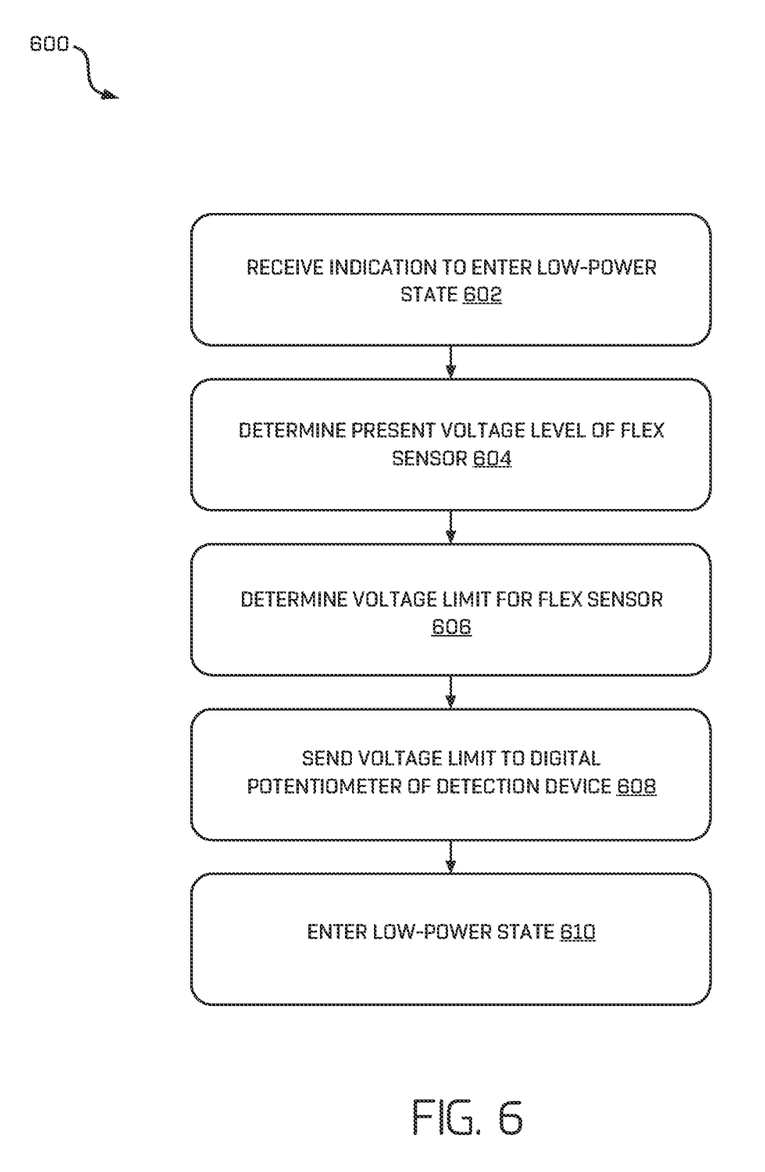
FIG. 6 depicts a flow chart of an example process for setting voltage limits.

To describe an example of a control system 112 in more detail, FIG. 2 shows a circuit diagram of an example circuit that may be used to implement interaction detection as described above in relation to FIG. 1. In FIG. 2, components that are also shown in FIG. 1 are labelled with the same reference numeral. Although in FIG. 1 the reference numerals 140 and 142 referred to a specific sensor and emitter, they are used in FIG. 2 to refer to sensors 140 and emitters 142 more generally. Similarly, the numeral 138 is used to refer to a general alert signal from the main control unit 126. FIG. 3 is also provided, which illustrates an example of part of the circuit of FIG. 2, while FIG. 5 and FIG. 6 show flow charts associated with the operation of the interaction detection device 120 and the main control unit 126 respectively.

As can be seen in FIG. 2, the auxiliary power source 122 is connected to a plurality of different flex sensors 110. Each flex sensor 110, referred to as flex sensors 110 in FIG. 2, has a corresponding resistor 160. Each pair of a resistor 160 and a flex sensor 110 are arranged as a voltage divider in the example of FIG. 2, with the flex sensors being connected to ground. An input voltage is provided from the auxiliary power source 122. An output voltage is output from the connection point 162 between the resistor 160 and the flex sensor 110. The output voltage is a fraction of the input voltage, and is proportional to the relative impedances of the resistor 160 and flex sensor 110, as indicated in by the following equation, where $V_{out}$ is the output voltage, $V_{in}$ is the input voltage, $R_1$ is the resistance of the resistor 160, and $R_2$ is the resistance of the flex sensor 110. In this example, it is assumed that the flex sensor 110 comprises a variable resistor, meaning that the impedances are both resistances:

$$V_{out} = \frac{R_2}{R_1 + R_2} V_{in}$$

In some examples, the flex sensor 110 may comprise a capacitor having a variable capacitance that is proportional to the amount of bending of the sensor 100. In some examples, the flex sensor 110 is implemented using a different arrangement to the arrangement shown in FIG. 2. In some examples, the resistor 160 may be replaced with another impedance. The resistance of each resistor 160 may be particular to the flex sensor 110 with which it forms the voltage divider. The resistance of the resistor 160 may be tuned to ensure that particular amounts of deformation of the flex sensor 110 cause a particular change in the output voltage.

The output voltage from the voltage divider is provided as an input to the interaction detection device 120. The interaction detection device 120 comprises a comparator device 164 for each flex sensor 110. Each comparator device 164 is configured to receive at least two input voltages. The first input voltage is the voltage from the flex sensor 110. The comparator device 164 is also configured to receive at least a second input voltage corresponding to a voltage threshold level. The second input voltage may be received by the comparator device 164 from a further component of the interaction detection device 120. In the example of FIG. 2, the further component is a digital potentiometer 166, which is referred to in FIG. 2 as a DigiPot. In the example shown in FIG. 2, a specific digital potentiometer 166 is provided for each comparator device 164. This is because each comparator device 164 corresponds to a different flex sensor 110, and the limits for each flex sensor 110 may be specific to the flex sensor 110. A digital potentiometer 166 is useful for performing the function of setting limit values because the limit value may be changed quickly and in real-time.

In other examples, the function of the digital potentiometers 166 may instead be performed using a look-up table stored in memory, that is accessible to each comparator device 164. Digital potentiometers 166 enable very low power usage from the auxiliary power source 122 and may be reconfigurable depending on environmental or other conditions as disclosed herein. Similarly, analogue comparators that based their voltage comparison on received electrical signals also represent a low-power solution. Implementing components such as memory and comparators that are configured to access memory may require more power consumption, although other benefits may be gained such as an increased speed of determination of a low-level interaction.

The digital potentiometer 166 may provide the second input voltage, which corresponds to a limit value for the first input voltage, to its respective comparator device 164. The digital potentiometer may also provide a third input voltage, which corresponds to another limit value for the first input voltage. Where the digital potentiometer 166 provides only a second input voltage, this may correspond to either an upper voltage limit or a lower voltage limit. Where the digital potentiometer 166 provides second and third input voltages, these correspond to upper and lower voltage limits, thereby defining an allowable voltage range between the limits.

The digital potentiometers 166 may receive the limit values from the main control unit 126 when the main control unit 126 is operational, i.e. not in a low-power state. For example, prior to the main control unit 126 entering the low-power state, the main control unit 126 may be configured to determine a present, i.e. current, voltage level output from a flex sensor 110, and determine a corresponding voltage limit value. It may then communicate the limit value to the digital potentiometer 166 corresponding to the flex sensor 110 via the connection 168. The connection 168 may comprise a serial communication protocol such as Serial Peripheral Interface (SPI) or Inter-Integrated Circuit (I2C). The process by which a main control unit 126 may set the limit values is described in more detail in relation to FIG. 6.

An example of a comparator device 164 is also shown in FIG. 3. The example of FIG. 3 illustrates the circuitry of a comparator device 164 that is configured to receive both a second input voltage and a third input voltage from the digital potentiometer 166. The comparator device 164 of FIG. 3 may therefore be considered to be a window comparator.

In FIG. 3, the comparator device 164 is shown to include a first comparator 180 and a second comparator 182. Each comparator 180 and 182 comprises a positive voltage input and a negative voltage input, indicated by + and − signs respectively, and a transistor 184. The transistor 184 may comprise a MOSFET, and may operate as a logic gate.

The first comparator 180 is configured to receive the first input voltage from the flex sensor 110 at its negative input and the second input voltage, representing an upper voltage limit, from a digital potentiometer 166 at its positive input. The first comparator 180 may be configured to compare the first and second input voltages, to determine if the first input voltage exceeds the second input voltage. If the first input voltage does exceed the second input voltage, then an alert signal may be output from the comparator 180 to connection point 188. A pull-up resistor 186 is provided to ensure that the output of the comparator 180 (or, as will be described below, of the comparator 182) is defined by pulling the output to ground if the input conditions of either comparator are satisfied (i.e. the voltage limit of the comparator is exceeded). The alert signal is subsequently output from the comparator device 164 to be communicated to the main power source 128. The resistor 186 may alternatively be a pull-down resistor. Although the resistor 186 is depicted here as being provided within the comparator device 164, a pull-up or pull-down resistor may be external to the comparator device 164. A common pull-up or pull-down resistor may be provided for a plurality of comparator devices 164.

The second comparator 182 is configured to receive the first input voltage from the flex sensor 110 at its positive input and the third input voltage, representing the lower voltage limit from a digital potentiometer 166 at its negative input. The same digital potentiometer 166 may provide both the second and third input voltages. In other examples, one digital potentiometer may be configured to provide the second input voltage and a different digital potentiometer may be configured to provide the third input voltage.

The second comparator 182 may be configured to compare the first and third input voltages, to determine if the first input voltage is below, i.e. exceeds, the third input voltage. If the first input voltage does exceed the third input voltage, then an alert signal may be output from the second comparator 182 to connection point 190. The wake-up signal is subsequently output from the comparator device 164 to be communicated to the main power source 128.

The alert signal output by the comparators 180, 182, and as output more generally by the comparator device 164, may comprise a voltage output signal. As indicated in FIG. 3, the comparators 180, 182 are configured to control a transistor 184 operating as a logic gate, and the transistor 184 may be connected to the auxiliary power supply 122, which supplies a source voltage for the transistor. The output at the connection points 188 and 190 may be varied by the operation of the transistors 184 based on the comparison performed at the comparators 180 and 182. Accordingly, the alert signal may comprise a voltage level at the point 188 or 190 caused by operation of the transistor.

While FIG. 3 shows one example of a type of comparator device 164 that may be used in the invention, other types of comparators and architecture may be used to achieve the result of comparing the input voltage signals. In some examples, the comparator device 164 may incorporate the functionality of the digital potentiometer 166. In some examples, the comparator device 164 may comprise a processor.

Returning to FIG. 2, as described above, the output from the comparator devices 164 may comprise an electrical signal comprising a specific voltage level or other logic signal 170. The logic signal may indicate either that a limit value has been exceeded and may therefore be referred to as an alert signal. The alert signal may indicate that a low-level interaction has occurred. Alternatively, the logic signal may indicate that no limit value has been exceeded, meaning that no interaction has occurred.

As depicted in FIG. 2, the output is received by the main power source 128. The main power source 128 may be configured to activate and begin supplying power to the main control unit 126 if the logic signal 170 indicates that a low-level interaction has occurred. A pull-up (or pull-down) resistor may be incorporated between the comparator devices 164 and the main power supply 128 to ensure that the logic signal takes a known state. The logic signal may take a first value to indicate that no deformation has taken place or a second value to indicate that deformation has taken place.

The main control unit 126, as was described in relation to the scenario at point in time C of FIG. 1, may be configured to analyze the output voltages from the voltage dividers comprising the flex sensors 110. The main control unit 126, when operational, may monitor the output voltages at connection points 172. The main control unit 126 may also be configured to receive from the digital potentiometers 166 the limit values to enable the main control unit 126 to perform its own analysis by comparing the output voltage signal to the limit values to determine whether a low-level interaction is occurring or has occurred.

The main control unit 126 may be configured to analyze the output voltage that caused the alert signal to be sent. This may be achieved by incorporating a buffer to buffer the output voltages so that the main control unit 126 can access earlier voltage signals. Additionally or alternatively, the main control unit 126 may monitor current voltage outputs. Current voltage outputs from the connection points 172 may also be buffered to allow analysis of the voltage over time, as will be described below. An analogue-to-digital converter may be incorporated to enable the voltage output at the connection points 172 to be monitored. The analogue-to-digital converter may provide for richer and/or more complex analyses to be performed on signals than otherwise may be available through the use of comparators, for example.

Figure 4:
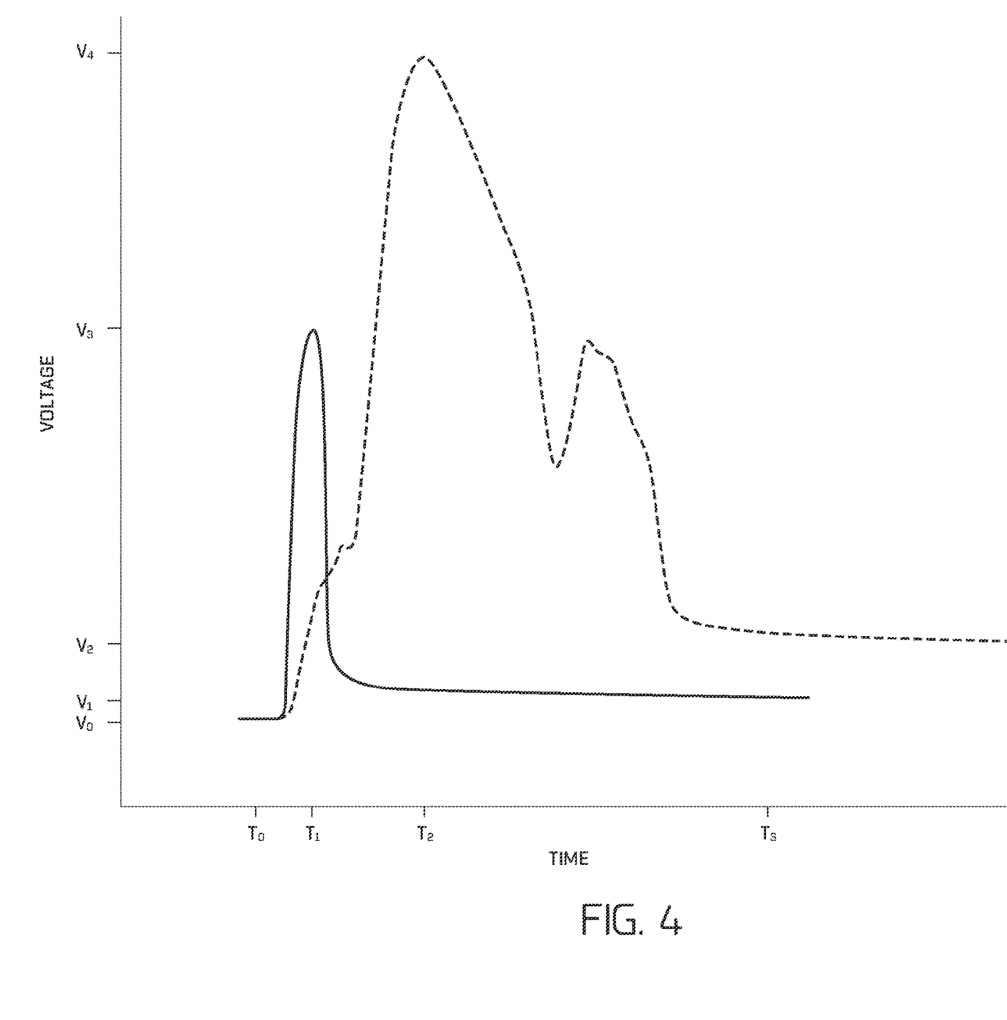
FIG. 4 is a chart depicting voltage outputs from a flex sensor in reaction to two different interactions.

The main control unit 126 may be configured to analyze a voltage waveform and/or characteristics of the voltage based on its monitoring. As an example, FIG. 4 shows a chart of voltage against time, and depicts output voltages of a flex sensor in response to two different interactions. A first curve, depicted with a solid line, represents the output voltage of the flex sensor in response to a first low-level interaction with an object of small mass at high speed. For example, if the first low-level interaction is that an object is thrown at the vehicle, or a pedestrian kicks or otherwise hits the vehicle, the output voltage of the flex sensor may resemble the first curve. A second curve, depicted with a dashed line, represents the output voltage of the flex sensor in response to a second low-level interaction with an object of high mass at low speed. For example, such a response may be seen if another vehicle drives into the parked vehicle at low speed.

The first and second low-level interactions begin at time $T_0$. The voltage level at time $T_0$ is $V_0$ in this example. The starting voltage level of a flex sensor may be any value. In both curves, it can be seen that a peak in output voltage level is observed after a steep gradient, before the output voltage reduces again. The peaks are found, for the first curve, at time $T_1$ and voltage level $V_3$, and, for the second curve, at time $T_2$ and voltage level $V_4$. The main control unit 126 may be configured to determine the peak magnitude of the output voltage. From the peak magnitude, the main control unit 126 may be configured to determine an amount of deformation or an amount of impact energy within the low-level interaction and may therefore determine the type of low-level interaction taking place.

After the peak, the output voltage from the flex sensor does not return to its original level. Instead, there is a change in output voltage at the flex sensor that is observable long after the original peak of the output voltage level. Even though the residual output voltage may only correspond to approximately 50 J of impact energy, this is sufficient to enable a low-level interaction to be identified as having occurred. These levels can be seen, for the first curve, at time $T_2$ and at voltage level $V_1$, and, for the second curve, at $T_3$ and at voltage level $V_2$. As may be understandable, the greater interaction, represented by the second, dashed curve, has a higher residual output voltage than the first, solid curve. This is caused by a greater amount of deformation during the interaction.

The first low-level interaction, represented by the first curve, is a relatively short event. Accordingly, by the time the main control unit 126 is able to begin monitoring the output voltage levels after waking from its sleep state, the residual change in voltage level from its original level will still be observable. Accordingly, if the threshold voltage level is set below this level, the main control unit 126 will still be able to identify that a low-level interaction has occurred, even if the voltage levels have already peaked.

In the second low-level interaction, the time over which the low-level interaction occurs is longer. In this scenario, the main control unit 126 may begin monitoring at the peak of the voltage levels, meaning that it can track the shape and gradient of the voltage as well as the absolute value relative to the threshold. Accordingly, based on these characteristics, for longer events, such as a slow vehicle impact, the main control unit 126 may be able to identify what kind of event has occurred based on voltage levels from the flex sensors alone, and may act accordingly.

Returning to FIG. 2, the main control unit 126 may be configured to confirm that a low-level interaction has occurred based on monitoring the output voltages at connection points 172. For example, if the main control unit 126 performs a comparison of the output voltages and the respective limit values and identifies that an output voltage exceeds its limit value, then it may perform further actions, such as emitting a further alert signal 138 to other vehicle systems.

In some examples, the main control unit 126 may be configured to determine the severity of the low-level interaction, based on a peak voltage level from the flex sensor 110. In some examples, the main control unit 126 may be configured to determine a shape and/or gradient of a voltage signal, by determining a plurality of voltage levels from the flex sensor 110 over a period of time. Based on the shape and/or gradient, the main control unit 126 may be configured to determine that a low-level interaction is occurring and may also be configured to determine what kind of low-level interaction is occurring.

In some examples, the main control unit 126 may determine, based on the voltage levels from the flex sensor 110, that no interaction has occurred, and that the alert signal was caused by an anomalous reading. In this situation, the main control unit 126 may be configured to re-enter the sleep state. Prior to re-entering the sleep state, the main control unit 126 may be configured to reset the limit values stored by the digital potentiometers 166 to reflect the present voltage levels of output from the flex sensors 110.

The further alert signal 138 may be emitted to sensors 140 and/or emitters 142 to activate these components. For example, sensors 140 such as cameras or microphones may be activated to provide further monitoring of the vehicle. Other sensors, as will be described in relation to FIG. 7, may also be activated. Emitters 142 may be activated to provide a warning to the object interacting with the vehicle 100. For example, a loudspeaker or headlight of the vehicle may be activated to indicate that a low-level interaction is occurring.

The sensors and/or emitters that are activated may depend on what kind of low-level interaction is determined to be occurring. For example, if vandalism is occurring, a loudspeaker may be activated and a warning played through the loudspeaker. A camera may also be activated to film the vandalism as it is occurring, and headlights may be activated to illuminate the scene, if it is dark. On the other hand, if another vehicle is reversing into the vehicle, the headlights of the vehicle may be activated to repeatedly flash at the other vehicle to alert it to the vehicle.

In some examples, the alert signal 138 may be transmitted to a remote computing system. The remote computing system may be a system at which remote operators are active who may command the vehicle to take appropriate action.

In some examples, the flex sensors may be arranged in parallel such that their output voltage levels are combined. The output voltage levels may therefore be passed through a single comparator. By combining the electrical signals into a single signal, only a single comparator and digital potentiometer may be required, further reducing the amount of power consumed by the system. In these examples, a limit value is set based on the lowest initial voltage of the flex sensors 110. Such an arrangement may sacrifice the ability to more distinctly identify the location of the signal by the main control unit. In some examples, however, the main control unit may be configured such that individual readings of the output voltages of the flex sensors may be made.

FIG. 5 illustrates a flow chart of a process 500 for the operation of the interaction detection device 120. At step 502, a sensor signal is determined. The signal may be received from the flex sensor 110 or otherwise determined from the flex sensor 110. The signal is compared to a limit value at step 504, which may be a voltage limit value. As already described above, the limit value may be received from a digital potentiometer 166. The limit value may be set by the main control unit 126 prior to it entering a low-power state. FIG. 6 describes the process of setting a limit value for a flex sensor and will be described after FIG. 5 has been fully described.

At step 506, the device 120 determines if the signal exceeds the limit value 506. As described in relation to FIG. 2 and FIG. 3, this may be performed using a comparator.

If it is determined that the signal does not exceed the limit value, 'No' in response to step 506, then the process moves back to step 502, and the process repeats.

If it is determined that the signal does exceed the limit value, 'Yes' in response to step 506, then an alert signal is output at step 508. In response to the alert signal 508, an appropriate action is determined and performed 510.

At step 510, the main control unit 126 may activate by transitioning to a high-power, may analyze one or more signals from the flex sensors or further sensors, and may determined the appropriate action before implementing it. Actions may include actions performed by operating components or hardware of the vehicle or actions performed by communicating with one or more remote systems. For example, the action may comprise activating further sensors to monitor, record, or stream what is happening in the environment around the vehicle. The action may comprise performing further analysis, either locally or remotely, of the output of the flex sensors to gather more information. Further actions may then be performed based on the initial or further analysis. The action may comprise controlling an emitter of the vehicle to emit a warning. The emitter may be a headlight of the vehicle or other light. The warning may be flashing of a light. The emitter may be a speaker of the vehicle. The warning may be a spoken message or a siren. An array of lights and/or an array of speakers may be configured to implement beamforming or directional audio/visuals to target the object causing the deformation. The action may comprise operating safety component of the vehicle. Safety features may include passenger airbags, external airbags, or other features to protect pedestrians, objects, or passengers of the vehicle. The action may comprise operating the vehicle to move away from the object causing the deformation. In some examples, the initial or further analysis may reveal that the damage to the vehicle may prevent it from moving, and in these examples the vehicle may communicate a request for maintenance, assistance, or, where there are users within the vehicle, for a new vehicle to be sent to pick the users up to enable them to continue their journey. In other examples, the vehicle may determine the action to be performed as sending a message to a remote computing device. For example, the message may be a request for emergency assistance from police, fire, or ambulance services. The message may be to send data from the sensors to the remote computing device or to send a request for further analysis of data already transmitted. The message may be an alert message to a remote operator terminal. The alert message may request assistance and/or guidance as to how to act in response to the deformation or may request the remote operator to take control of the vehicle temporarily. The message may be a request for maintenance or a request to schedule maintenance. In some examples, the analysis may reveal that no deformation is taking place and/or that the interaction that is occurring is a low-level interaction but that it is not causing damage to the vehicle (for example, someone is leaning against the vehicle). Action in response to such a determination may be to re-enter the low-power state, adjust the threshold values for the comparator devices, or to emit a warning.

In general, the process described in FIG. 5 and which is also discussed above in relation to FIGS. 1 to 3, may comprise steps of determining a sensor signal from a flex sensor in an exterior panel, determining based on the sensor signal that the exterior panel is deforming, and outputting an alert signal. As will be appreciated, the detector or detection device may determine whether the exterior panel is deforming based on criteria other than a threshold value in some examples. For example, the exterior panel may be determined to be deforming if an absolute value of an electrical signal reaches a particular level, if a gradient is above a particular value, or if a shape of a plurality of signals is recognized as indicating a low-level interaction.

FIG. 6 illustrates a flow chart of a process 600 by which a main control unit 126 sets the voltage limits for each flex sensor 110. At step 602, the main control unit 126 receives an indication or determines that it will enter the low-power state.

In response to receiving this indication at step 602, at step 604, the main control unit 126 may determine a present voltage level of the flex sensor 110. The present voltage level of the flex sensor is determined to ensure that voltage limit values are set relative to the voltage level immediately prior to the main control unit 126 entering the low-power state.

At step 606, based on the present voltage level determined at step 604, a voltage limit value for the flex sensor is determined. The voltage limit value may be set based on properties of the panel in which the flex sensor is incorporated, as well as properties of the flex sensor itself. In some examples, the voltage limit value may be set to be below the residual voltage level observed when the panel deflects, as described above in relation to FIG. 4. As was shown in that figure, the voltage level does not immediately return to its original voltage level, meaning that the panel may remain deflected or deformed for some period after the low-level interaction. Accordingly, to enable the main control unit 126 to identify that a low-level interaction has occurred after it is woken and after a low-level interaction has occurred, this residual deformation may be harnessed to ensure that the low-level interaction is not classified as noise.

At step 608, the voltage limit is communicated to the digital potentiometer 166 corresponding to the flex sensor 110. After this, at step 610, the main control unit 126 may enter the low-power state.

Subsequently, the voltage limit is maintained by the digital potentiometer 166 at the level set by the main control unit 126 prior to it entering the low-power state, meaning that the comparator device 164 is capable of determining when a low-level interaction has occurred even when the main power supply 128 and/or the main control unit 126 may not be active.

Figure 7:
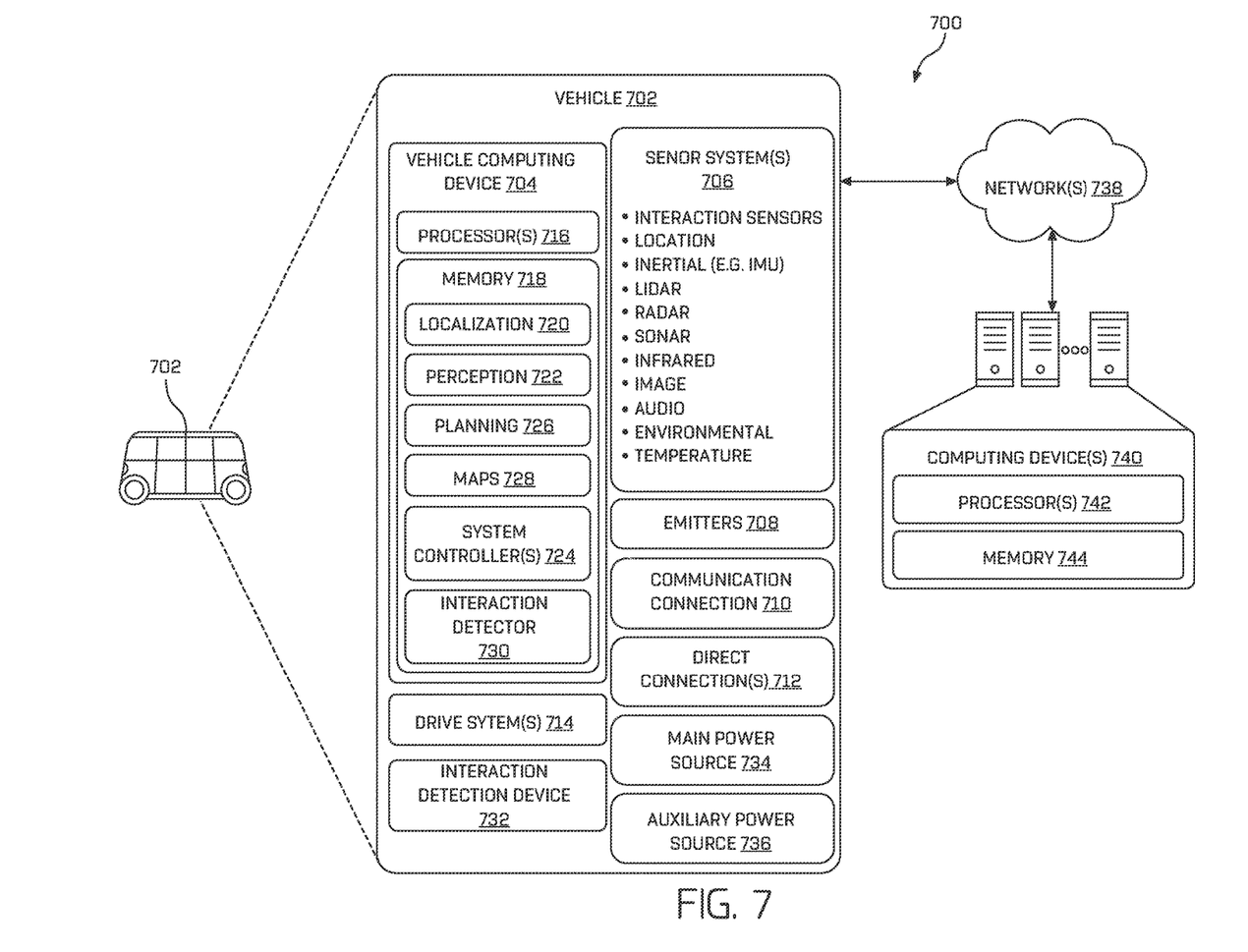
FIG. 7 is a block diagram of an example vehicle system.

FIG. 7 depicts a block diagram of an example system 700 for implementing the techniques described herein. In some instances, the system 700 may include a vehicle 702, which may correspond to the vehicle 100 of FIG. 1. In some instances, the vehicle 702 may be a self-driving or autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 702 may be a fully or partially autonomous vehicle having any other level or classification. Moreover, in some instances, the techniques described herein may be usable by non-autonomous vehicles as well.

The vehicle 702 can include vehicle computing device(s) 704, such as the main control unit 126, one or more sensor systems 706, one or more emitters 708, one or more communication connections 710, at least one direct connection 712 (e.g., for physically coupling the vehicle 702 to exchange data and/or to provide power), and one or more drive systems 714.

In some instances, the sensor(s) 706 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), drive system sensors for torque and/or velocity sensing etc. The sensor(s) 706 may include multiple instances of each of these or other types of sensors. For instance, the LIDAR sensors may include individual LIDAR sensors located at the corners, front, back, sides, and/or top of the vehicle 702. As another example, the cameras may include multiple cameras disposed at various locations about the exterior and/or interior of the vehicle 702. The sensor(s) 706 may provide input to the vehicle computing device(s) 704. The sensor(s) 706 may further include impact sensors, such as the flex sensors 110.

The vehicle 702 may also include the emitter(s) 708 for emitting light and/or sound. The emitter(s) 708 in this example may include interior audio and visual emitter(s) to communicate with passengers of the vehicle 702. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 708 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 702 may also include the communication connection(s) 710 that enable communication between the vehicle 702 and one or more other local or remote computing device(s). For instance, the communication connection(s) 710 may facilitate communication with other local computing device(s) on the vehicle 702 and/or the drive system (s) 714. Also, the communication connection(s) 708 may additionally or alternatively allow the vehicle 702 to communicate with other nearby computing device(s) (e.g., other nearby vehicles, traffic signals, etc.). The communication connection(s) 710 may additionally or alternatively enable the vehicle 702 to communicate with a computing device 736.

The vehicle computing device(s) 704 can include one or more processors 716 and memory 718 communicatively coupled with the one or more processors 716. In the illustrated example, the memory 718 of the vehicle computing device(s) 704 stores a localization component 720 perception component 722, a planning component 724, one or more maps 726, and one or more system controllers 728. The memory 718 may also include an interaction detector 730. The interaction detector 730 may be configured to monitor output voltages from the one or more interaction sensors, as part of a main control unit, and determine whether a low-level interaction has taken place. Though depicted in FIG. 7 as residing in memory 718 for illustrative purposes, it is contemplated that the localization component 720, the perception component 722, the planning component 724, the one or more maps 726, and the one or more system controllers 728 may additionally, or alternatively, be accessible to the vehicle 702 (e.g., stored remotely).

In some instances, the localization component 720 may be configured to receive data from the sensor system(s) 706 to determine a position and/or orientation of the vehicle 702 (e.g., one or more of an x-, y-, z-position, roll, pitch, or yaw). For example, the localization component 720 may include and/or request/receive a map 726 of an environment and may continuously determine a location and/or orientation of the autonomous vehicle within the map 726.

In some instances, the perception component 722 can include functionality to perform object detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, unknown, etc.). In additional or alternative examples, the perception component 722 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some instances, the planning component 724 may determine a location of a user based on image data of an environment received from the user using, for example, bags of binary words with image-based features, artificial neural network, and the like. Further, the planning component 724 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 702 may stop to pick up a passenger. In at least one example, the planning component 724 may determine a pickup location based at least in part on determining a user identity (e.g., determined via image recognition or received as an indication from a user device, as discussed herein).

In some instances, the one or more maps 726 may be used by the vehicle 702 to navigate within the environment. For the purpose of this discussion, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, multiple maps 726 may be stored based on, for example, a characteristic (e.g., type of entity, time of day, day of week, season of the year, etc.). Storing multiple maps 726 may have similar memory requirements, but increase the speed at which data in a map may be accessed.

In at least one example, the vehicle computing device(s) 704 can include one or more system controllers 728. The system controller 728 can be configured to control steering, propulsion, braking, safety, emitters, communication, and other systems of the vehicle 702. The system controller(s) 728 can communicate with and/or control corresponding systems of the drive system(s) 714 and/or other components of the vehicle 702. The system controller(s) 728 may be communicatively coupled to one or more sensors of the vehicle sensor system(s) 706.

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive system with one or more other local or remote computing device(s). In the example of FIG. 7, the main power source 734 and auxiliary power source 736 are depicted separately from the drive systems 714 for clarity.

The vehicle 702 further comprises an interaction detection device 732, which may correspond to the interaction detection device 120.

In some examples, the vehicle 702 can send operational data, including raw or processed sensor data from the sensor system(s) 706, to one or more computing device(s) 740 via the network(s) 738. The one or more computing device(s) 740 may comprise one or more processors 742 and memory 744. The one or more computing devices 740 may be remote from the vehicle.

In some instances, aspects of some or all of the components discussed herein may include any models, algorithms, and/or machine learning algorithms. For example, the component(s) in the memory 718, 744 may be implemented as a neural network. As can be understood in the context of this disclosure, a neural network can utilize machine learning, which can refer to a broad class of such algorithms in which an output is generated based on learned parameters.

Example Clauses

A: A vehicle comprising: at least one exterior panel formed of a flexible material; a main power source; an auxiliary power source; a main controller connected to the main power source, the main controller configured to operate in an operational state, in which power is drawn from the main power source, and in a sleep state, in which less power is drawn from the main power source; and a low-level interaction detection device connected to the auxiliary power source and comprising a circuit that includes at least one flex sensor coupled to the at least one exterior panel and at least one comparator, wherein: the flex sensor comprises a variable resistor configured to vary an output voltage relative to an amount of bending of the flex sensor; and the comparator is configured to receive the output voltage from the flex sensor, as a first input voltage and a limit voltage as a second input voltage, and wherein the comparator is configured to: compare the output voltage and the limit voltage; and output a logic signal to the main power source based on the result of the comparison, wherein if the logic signal indicates that the output voltage exceeded the limit voltage, the main controller is configured to operate in the operational state based at least in part on the logic signal indicating that the output voltage exceeded the limit voltage.

B: A vehicle as clause A describes, wherein, in response to the main power source supplying the main controller with power, the main controller is configured to: determine a present output voltage from the flex sensor; determine that the present output voltage indicates a low-level interaction at the at least one exterior panel based on the present output voltage; and determine an appropriate action to take based on the low-level interaction.

C: A vehicle as clause B describes, comprising an emitter, wherein the main controller is configured to: determine the appropriate action to be emitting a warning to an object causing the low-level interaction; control the emitter to emit the warning to the object.

D: A vehicle as clause B or clause C describes, comprising a communication connection configured to communicate with a remote computer, and wherein the main controller is configured to: determine the appropriate action to be transmitting an alert message to the remote computer; and controlling the communication connection to transmit the alert message to the remote computer.

E: A method comprising: determining, at a detector, a first sensor signal from a flex sensor in an exterior panel of a vehicle, wherein the flex sensor and detector are powered by a power source of the vehicle, and wherein a magnitude of the first sensor signal is based on an amount of bending of the flex sensor; determining, at the detector, based on the first sensor signal, that the exterior panel of the vehicle is deformed; and outputting, from the detector, a first alert signal, wherein a first controller of the vehicle is configured to transition from a low-power state to a high-power state based at least in part on the first alert signal.

F: A method as clause E describes comprising, at the first controller: transitioning from the low-power to the high-power state; analyzing at least one of the first sensor signal, a second sensor signal from the flex sensor, or a third sensor signal from a further sensor; determining an action based on analyzing the first, second, or third sensor signal.

G: A method as clause F describes, comprising: determining, based on analyzing the first, second or third sensor signal, that the exterior panel of the vehicle is deformed; determining the action to be operating at least one component of the vehicle; and operating the at least one component of the vehicle.

H: A method as clause G describes, wherein operating the at least one component of the vehicle comprises at least one of: controlling an emitter of the vehicle; controlling a drive system of the vehicle; or controlling a safety component of the vehicle.

I: A method as any one of clauses F to H describe, comprising: determining, based on analyzing the first, second or third sensor signal, that the exterior panel of the vehicle is deformed; determining the action to be sending a message to a remote computing device; and sending the message to the remote computing device.

J: A method as clause I describes, wherein sending the message to the remote computing device comprises at least one of: sending a request for emergency assistance; sending data from the flex sensor or a further sensor for further analysis and/or storage at a remote computer; sending an alert message to a remote operator terminal; or sending a request for maintenance of the vehicle to a remote computing device.

K: A method as any one of clauses E to J describe comprising: determining, at the detector, a limit value for the magnitude of the first sensor signal; and performing a comparison, at the detector, the first sensor signal and the limit value, wherein determining that the exterior panel of the vehicle is deforming is based on the comparison of the first sensor signal and the limit value.

L: A method as clause K describes, wherein determining the limit value comprises receiving the limit value from the first controller prior to determining the first sensor signal.

M: A method as clause L describes, comprising, at the first controller: receiving an instruction to enter the low-power state; determining a sensor signal from the flex sensor; determining the limit value based on the sensor signal; sending the limit value to the detector; and entering the low-power state.

N: A method as any one of clauses E to M describe, wherein the first alert signal is configured to cause a main power source of the vehicle to supply power to the first controller to cause the first controller to transition from the low-power state to the high-power state.

O: A system comprising: a flex sensor for mounting in an exterior panel of a vehicle, and that is configured for connection to a power source; and a detector configured for connection to the power source and to the flex sensor, wherein the detector is configured to: determine a first sensor signal from the flex sensor, wherein a magnitude of the first sensor signal is based on an amount of bending of the flex sensor; determine based on the first sensor signal that the exterior panel of the vehicle is deformed; and output a first alert signal, wherein a first controller of the vehicle is configured to transition from a low-power state to a high-power state based at least in part on the first alert signal.

P: A system as clause O describes, comprising an auxiliary power source and wherein the detector and flex sensor are connected to and powered by the auxiliary power source.

Q: A system as clause O or P describe, wherein the flex sensor has a variable resistance that is proportional to an amount of bending of the flex sensor.

R: A system as any one of clauses O to Q describe, comprising a voltage divider, the voltage divider including a first resistor and the flex sensor arranged in series.

S: A system as any one of clauses O to R describe, wherein the detector comprises a comparator and a digital potentiometer, wherein the digital potentiometer is configured to determine a limit value and wherein the comparator is configured to: receive the first sensor signal from the flex sensor and the limit value from the digital potentiometer; perform a comparison of the first sensor signal and the limit value; determine based on the comparison of the first sensor signal and the limit value that the first sensor signal is outside the limit value; and output the first alert signal.

T: A system as any one of clauses O to S describe, comprising the exterior panel, wherein the flex sensor is mounted in the exterior panel, and wherein the exterior panel comprises a fascia, a wheel fender, an A-pillar, a B-pillar, or a roof panel of the vehicle.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. A vehicle comprising:
   at least one exterior panel formed of a flexible material;
   a main power source;
   an auxiliary power source;
   a main controller connected to the main power source, the main controller configured to operate in an operational state, in which power is drawn from the main power source, and in a sleep state, in which less power is drawn from the main power source; and
   a low-level interaction detection device connected to the auxiliary power source and comprising a circuit that includes at least one flex sensor coupled to the at least one exterior panel and at least one comparator, wherein:
     the flex sensor comprises a variable resistor configured to vary an output voltage relative to an amount of bending of the flex sensor; and
     the comparator is configured to receive the output voltage from the flex sensor, as a first input voltage and a limit voltage as a second input voltage, and wherein the comparator is configured to:
       compare the output voltage and the limit voltage; and
       output a logic signal to the main power source based on the result of the comparison, wherein if the logic signal indicates that the output voltage exceeded the limit voltage, the main controller is configured to operate in the operational state based at least in part on the logic signal indicating that the output voltage exceeded the limit voltage.

2. The vehicle of claim 1, wherein, in response to the main power source supplying the main controller with power, the main controller is configured to:
   determine a present output voltage from the flex sensor;
   determine that the present output voltage indicates a low-level interaction at the at least one exterior panel based on the present output voltage; and
   determine an appropriate action to take based on the low-level interaction.

3. The vehicle of claim 2, comprising an emitter, wherein the main controller is configured to:
   determine the appropriate action to be emitting a warning to an object causing the low-level interaction;
   control the emitter to emit the warning to the object.

4. The vehicle of claim 2, comprising a communication connection configured to communicate with a remote computer, and wherein the main controller is configured to:
   determine the appropriate action to be transmitting an alert message to the remote computer; and
   controlling the communication connection to transmit the alert message to the remote computer.

5. A method comprising:
   determining, at a detector, a first sensor signal from a flex sensor in an exterior panel of a vehicle, wherein the flex sensor and detector are powered by a power source of the vehicle, and wherein a magnitude of the first sensor signal is based on an amount of bending of the flex sensor;
   determining, at the detector, based on the first sensor signal, that the exterior panel of the vehicle is deformed; and
   outputting, from the detector, a first alert signal, wherein a first controller of the vehicle is configured to transition from a low-power state to a high-power state based at least in part on the first alert signal.

6. The method of claim 5 comprising, at the first controller:
   transitioning from the low-power to the high-power state;
   analyzing at least one of the first sensor signal, a second sensor signal from the flex sensor, or a third sensor signal from a further sensor;
   determining an action based on analyzing the first, second, or third sensor signal.

7. The method of claim 6, comprising:
   determining, based on analyzing the first, second or third sensor signal, that the exterior panel of the vehicle is deformed;
   determining the action to be operating at least one component of the vehicle; and
   operating the at least one component of the vehicle.

8. The method of claim 7, wherein operating the at least one component of the vehicle comprises at least one of:
   controlling an emitter of the vehicle;
   controlling a drive system of the vehicle; or
   controlling a safety component of the vehicle.

9. The method of claim 6, comprising:
   determining, based on analyzing the first, second or third sensor signal, that the exterior panel of the vehicle is deformed;
   determining the action to be sending a message to a remote computing device; and
   sending the message to the remote computing device.

10. The method of claim 9, wherein sending the message to the remote computing device comprises at least one of:
    sending a request for emergency assistance;
    sending data from the flex sensor or a further sensor for further analysis and/or storage at a remote computer;
    sending an alert message to a remote operator terminal; or
    sending a request for maintenance of the vehicle to a remote computing device.

11. The method of claim 5 comprising:
    determining, at the detector, a limit value for the magnitude of the first sensor signal; and
    performing a comparison, at the detector, the first sensor signal and the limit value, wherein determining that the exterior panel of the vehicle is deforming is based on the comparison of the first sensor signal and the limit value.

12. The method of claim 11, wherein determining the limit value comprises receiving the limit value from the first controller prior to determining the first sensor signal.

13. The method of claim 12, comprising, at the first controller:
    receiving an instruction to enter the low-power state;
    determining a sensor signal from the flex sensor;
    determining the limit value based on the sensor signal;
    sending the limit value to the detector; and
    entering the low-power state.

14. The method of claim 5, wherein the first alert signal is configured to cause a main power source of the vehicle to supply power to the first controller to cause the first controller to transition from the low-power state to the high-power state.

15. A system comprising:
- a flex sensor for mounting in an exterior panel of a vehicle, and that is configured for connection to a power source; and
- a detector connectable to the power source and to the flex sensor, wherein the detector is configured to:
  - determine a first sensor signal from the flex sensor, wherein a magnitude of the first sensor signal is based on an amount of bending of the flex sensor;
  - determine based on the first sensor signal that the exterior panel of the vehicle is deformed; and
  - output a first alert signal, wherein a first controller of the vehicle is configured to transition from a low-power state to a high-power state based at least in part on the first alert signal.

16. The system of claim 15, comprising an auxiliary power source and wherein the detector and flex sensor are connected to and powered by the auxiliary power source.

17. The system of claim 15, wherein the flex sensor has a variable resistance that is proportional to an amount of bending of the flex sensor.

18. The system of claim 15, comprising a voltage divider, the voltage divider including a first resistor and the flex sensor arranged in series.

19. The system of claim 15, wherein the detector comprises a comparator and a digital potentiometer, wherein the digital potentiometer is configured to determine a limit value and wherein the comparator is configured to:
- receive the first sensor signal from the flex sensor and the limit value from the digital potentiometer;
- perform a comparison of the first sensor signal and the limit value;
- determine based on the comparison of the first sensor signal and the limit value that the first sensor signal is outside the limit value; and
- output the first alert signal.

20. The system of claim 15, comprising the exterior panel, wherein the flex sensor is mounted in the exterior panel, and wherein the exterior panel comprises a fascia, a wheel fender, an A-pillar, a B-pillar, or a roof panel of the vehicle.

* * * * *